April 2, 1940.  C. V. McINTIRE ET AL  2,195,465
CARBURETED WATER GAS APPARATUS
Filed April 15, 1938
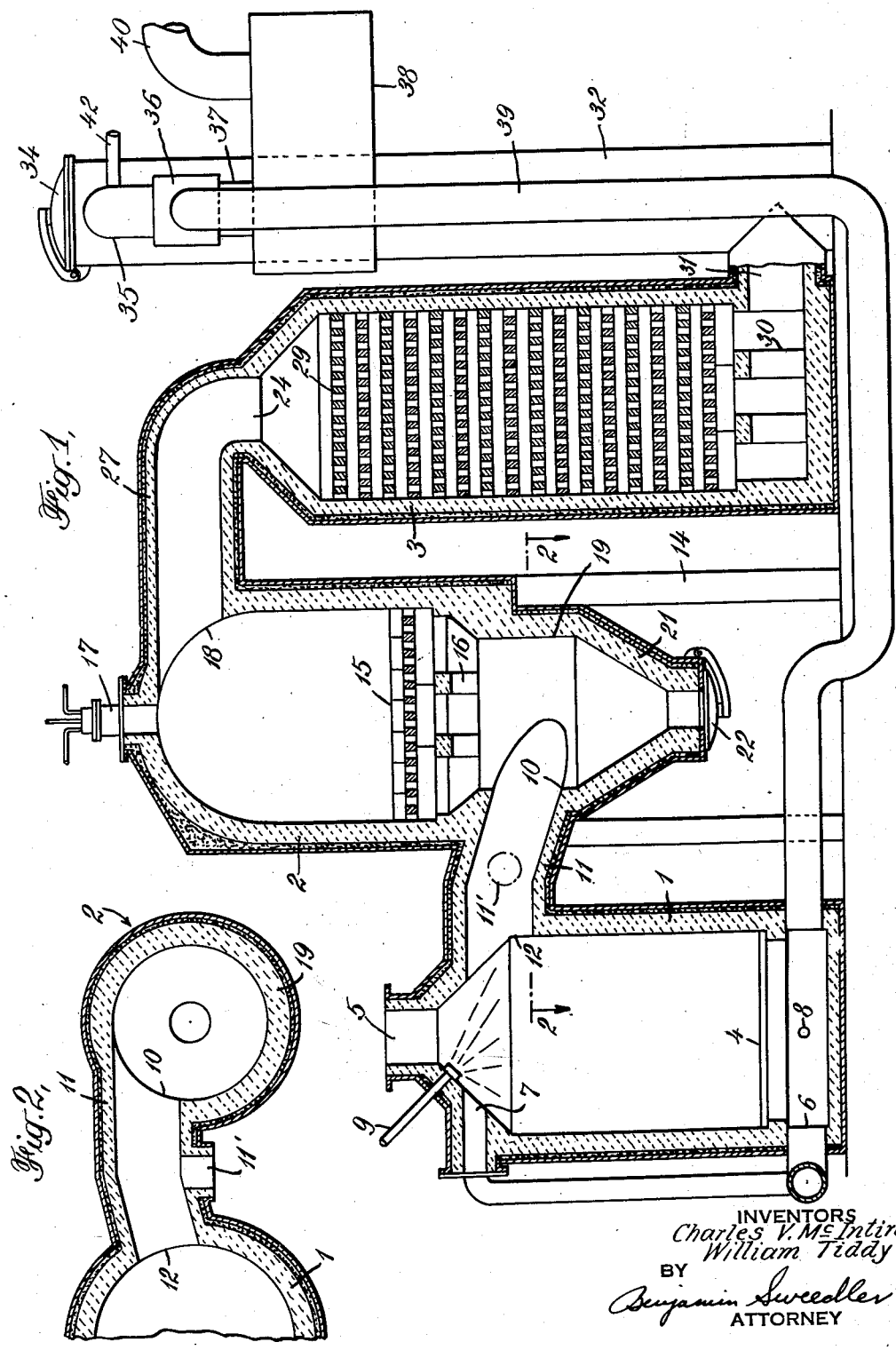
INVENTORS
Charles V. McIntire
William Tiddy
BY
Benjamin Sweedler
ATTORNEY Patented Apr. 2, 1940

2,195,465

UNITED STATES PATENT OFFICE 2,195,465

CARBURETED WATER GAS APPARATUS

Charles V. McIntire, Short Hills, N. J., and William Tiddy, New York, N. Y., assignors to Semet-Solvay Engineering Corporation, New York, N. Y., a corporation of New York Application April 15, 1938, Serial No. 202,176

2 Claims. (Cl. 48—79)

This invention relates to an improvement in the manufacture of water gas and more particularly to an improved apparatus for making carbureted water gas.

Within the past few years the carbureted water gas industry has adopted a novel type of water gas set involving a generator, carburetor and superheater located in separate and detached shells and connected in series, the top of the generator communicating with the base of the carburetor and the top of the carburetor communicating with the top of the superheater so that flow takes place up through the carburetor and down through the superheater, just the reverse of the direction of flow in conventional water gas equipment. This novel water gas set is disclosed and claimed in application Serial No. 101,238 filed September 17, 1936, now Patent No. 2,118,096, issued May 24, 1938, and will be referred to hereinafter as the "Reverse flow water gas set." The present invention is an improvement on such reverse flow sets in that its promotes better mixing of the blast gases and secondary air introduced into the carburetor, effects suspension in the burning blast gases of particles of fuel blown over from the generator into the carburetor and carbonaceous particles which settle in the carburetor during carburetion of water gas and combustion of these particles while in suspension with resultant fuel economy and reduction of carburetor cleaning and maintenance costs. The invention also promotes more effective distribution of heat in the carburetor so that more efficient vaporization of the carbureting oil is obtained.

In accordance with the invention, we provide a carbureted water gas set involving a carburetor, a generator and a superheater connected in series for flow of gases up through the carburetor and down through the superheater, the carburetor having a top outlet, an upwardly flaring cone-shaped base and a base inlet disposed to admit blast gases from the generator and secondary air into the carburetor base in a downward direction tangential to the walls of the base so that the burning gases sweep over these walls with a swirling rotary motion and then pass upwardly through the carburetor. The swirling of the burning blast gases in contact with walls of the carburetor base picks up the oil residue carbonaceous particles which have settled into the base during the previous carbureting step, and burns these particles while suspended in the blast gases, along with suspended particles of carbonaceous fuel blown over from the generator.

The turbulent rotary motion of the blast gases also promotes thorough admixture of these gases with the secondary air in the carburetor base, so that the gases are largely burned in the lower portion of the carburetor and increase the temperature of the lower part of the oil vaporizing zone where the heavier, less volatile constituents of the carbureting oil requiring high vaporization temperatures are volatilized. Furthermore, the flared walls of the carburetor base direct the heat stored in these walls during the blast period upwardly and increase the temperature of the lower part of the oil vaporizing zone thereby contributing to the oil utilization efficiency of the carburetor. We have found that the efficient burning of blast gases and carbonaceous particles and the improved distribution of heat in the carburetor in accordance with the invention results in higher oil efficiencies and economy of fuel and reduces carburetor cleaning and maintenance costs.

In the accompanying drawing wherein we have shown one form of apparatus for carrying out our invention:

Fig. 1 is a sectional view partly in elevation through a water gas set embodying the invention, and Fig. 2 is a horizontal sectional view taken on line 2—2 of Fig. 1.

Referring to the drawing in which like reference numerals indicate like parts, there is shown a water gas set comprising a generator 1, carburetor 2, and superheater 3. The generator is equipped with the usual grate 4 for supporting a body of fuel such as coal or coke, a fuel charging opening 5 adapted to be closed by suitable closure, not shown, air inlets 6 and 7 disposed beneath the grate and above the fuel bed respectively and a steam inlet 8 located beneath the grate for supplying steam thereto. An oil spray 9 leads into the top of the generator above the fuel bed to supply oil, which may be heavy oil such as Bunker C oil, during the gas making step if desired.

The carburetor 2 is elevated so that its base inlet 10 is substantially horizontally aligned with the top outlet 12 of the generator and rests on a suitable structural steel support 14. Base inlet 10 communicates with generator outlet 12 through refractory lined passageway 11 equipped with secondary air inlet 11'. The lower portion of the carburetor is provided with two or more layers of refractory material 15 disposed on arches 16; this refractory material may be checkerbrick or other refractory providing relatively large openings so as to avoid clogging thereof by fuel blown over from the fuel bed or carbonaceous deposits formed by vaporization of the carbureting oil. The portion of the carburetor above the checkerbrick 15 is unobstructed throughout its horizontal cross sectional area. A water cooled oil spray 17 is disposed at the top of the carburetor preferably on the vertical axis thereof and is arranged to supply oil which may be gas oil or heavy oil such as Bunker C oil to the carburetor during the water gas making steps in a direction countercurrent to the upward flow of water gas through the carburetor. The top of the carburetor has a gas outlet 18 leading into the top of the superheater 3.

The base of the carburetor involves a refractory lined vertical walled portion 19 of reduced cross sectional area as compared with the cross sectional area of the unobstructed portion above checkerbridge 15 and a refractory lined upwardly flaring cone-shaped portion 21. The inlet 10 of the carburetor extends downwardly into the carburetor base at one side thereof so that blast gases and secondary air introduced through the inlet enter the base of the carburetor downwardly in a direction tangential to the wall of the base. Impingement of the gases upon the vertical wall portion 19 and flared wall portion 21 causes the gases to swirl rapidly about the carburetor base in contact with the walls thereof. As the gases sweep over the carburetor they pick up and suspend in the gas current carbonaceous particles deposited in the base of the carburetor during the previous water gas carbureting step and retain in suspension particles of generator fuel blown over into the carburetor. These particles are burned in suspension by the secondary air which is admitted in amount sufficient to effect substantially complete combustion of the particles. The turbulent rotary motion of the gases effects thorough admixture of the blast gases and secondary air and thorough contact of the air with the carbon particles, thereby promoting efficient burning of the blast gases and carbon particles, largely in the lower part of the carburetor. Owing to the contact of the burning blast gases with the refractory walls of the carburetor base, these walls attain a high temperature and a large amount of radiant heat emanates therefrom. The upwardly flaring conical shape of the carburetor base causes this heat to be directed upwardly into checkerwork 15 and the lower part of the oil vaporizing zone. The base of the carburetor may be provided with a closure 22 which may be opened from time to time for inspection purposes and for the removal of the small amounts of relatively heavy material such as ash which collect in the base.

The superheater 3 has a circular inlet 24, the center of which is disposed to coincide with the longitudinal axis of the superheater. Inlet 24 of the superheater and outlet 18 of the carburetor are connected by a refractory lined passageway 27 which, as shown in the drawing, permits unobstructed flow of gas from the carburetor into the superheater. Checkerbrick 29, which may be of the type disclosed and claimed in United States Patent No. 1,927,834, granted September 26, 1933, completely fills the superheater 3 and rests on arches 30 disposed at the base of the superheater. Gas outlet 31 of the superheater leads into a vertical refractory lined stack 32 provided with a suitable stack valve 34. This stack is of a height somewhat greater than the height of the superheater so that, as shown on the drawing, stack valve 34 is disposed above the top of the superheater and constitutes the highest point of the set.

A conduit 35 leads from a point near the top of the stack 32 into a valve casing 36 which in turn communicates by pipe 37 with a wash box 38. Backrun line or conduit 39 leads from the base of the generator beneath the grate into valve casing 36. The valve casing 36, as well known in this art, is provided with a three-way valve for reversing flow through the set; i. e., in one position it permits flow of uprun gas from the superheater into wash box 38 while closing the backrun pipe and when reversed opens backrun pipe 39 so as to permit flow of backrun gas therethrough into the wash box while closing conduit 35. A gas offtake 40 leads from the wash box to the usual purification equipment.

Backrun steam inlet 42 is provided for supplying steam to the top of the stack which, as above indicated, communicates with the superheater.

The set may be operated as follows:

During the blasting step, air is admitted to the base of the generator and secondary air is introduced through inlet 11', the blast gases and air passing through carburetor inlet 10 in a downwardly inclined direction tangential to the walls of the carburetor base. These walls impart to the burning gases a swirling, rotary motion analogous to that of a whirlwind and as the gases sweep over the walls they pick up particles of oil carbon deposited in the base during a previous carburetting period and burn these particles as well as particles of blown over generator fuel in suspension. The turbulent rotary motion of the gases effects thorough mixture of the blast gases and secondary air and intimate contact between the air and carbon particles and hence promotes thorough burning of both the blast gases and the suspended particles, largely in the lower portion of the carburetor, so that the lower portion of the vaporizing zone, where the heavier, less volatile, fractions are vaporized, is heated to the high temperature necessary to effect such vaporization. Owing to the upwardly flared shape of the carburetor base, the heat stored in the refractory lining of the base is directed upwardly into checkerbrick 15 and serves to increase the temperature of the lower part of the oil vaporizing zone. The hot gases then pass out of the carburetor, down through the superheater and up through the stack.

After the blast period, steam is introduced into the bottom of the generator, the water gas leaving the top of the fuel bed passing upwardly through the carburetor in contact with the atomized oil introduced through spray 17 and thence downwardly through the superheater and upwardly through the stack from which it may pass through connection 35 to wash box 38. As the oil passes downwardly through the carburetor countercurrent to the upflowing water gas, the oil fractions are progressively volatilized, the heavier, less volatile, fractions being vaporized by the intense heat in the lower part of the vaporizing zone.

The uprun may be followed by a backrun during which steam is introduced into the stack through steam inlet 42 and is preheated as it flows through the stack, superheater and carburetor, backrun water gas being withdrawn from the base of the generator through backrun pipe 39. During the backrun or uprun or both, oil, which may be heavy oil such as Bunker C oil, may be introduced onto the top of the generator fuel bed through oil spray 9.

Since changes may be made without departing from the scope of the invention, it is intended that the above description should be interpreted in an illustrative and not in a limiting sense.

We claim:

1. A carbureted water gas set comprising in combination a generator, a carburetor having a substantially unobstructed upper portion and a top outlet, means for introducing oil into said carburetor, said carburetor having a restricted upwardly flaring base portion of smaller cross sectional area than said unobstructed upper portion, said carburetor having an inlet connecting said generator to the base of the carburetor and entering the restricted base portion in downwardly extending substantially tangential relation thereto so that blast gases introduced into the carburetor through said inlet immediately impinge against and swirl through the restricted base portion in contact with the flared walls and exert a lifting action on any carbon particles which may have been deposited in the base during a previous water gas carbureting step, and means for introducing secondary air into said carburetor.

2. A carbureted water gas set comprising a generator having a top outlet, a carburetor having a base inlet, a top outlet and an oil spray located at the top of the carburetor, and a superheater, said carburetor being elevated so that its inlet is substantially horizontally alined with the generator outlet, the top of the generator communicating with the base of the carburetor through said inlet and the top of the carburetor communicating with the top of the superheater so that flow takes place up through the carburetor and down through the superheater, means for introducing secondary air into said carburetor, the upper portion of said carburetor being substantially unobstructed, said carburetor having heat-storing refractory material therein below said upper unobstructed portion and occupying a minor portion of the volume of the carburetor above said base inlet, said carburetor having a restricted upwardly flared, cone-shaped, refractory lined base of smaller cross sectional area than the upper unobstructed portion of said carburetor, said base inlet being inclined downwardly in a direction substantially tangential to the walls of said restricted base portion whereby blast gases introduced from said generator through said base inlet immediately impinge against the walls of said base and sweep thereover with a rotary motion so that they are thoroughly mixed with secondary air in the base and exert a lifting action on carbonaceous particles deposited in the base during a previous water gas carbureting step to effect burning of the carbonaceous particles in suspension, said upwardly flared carburetor base directing heat stored therein during the blast period upwardly into said carburetor.

CHARLES V. McINTIRE.
WILLIAM TIDDY.